United States Patent
Hedges et al.

(10) Patent No.: US 11,904,539 B2
(45) Date of Patent: Feb. 20, 2024

(54) DEVICE FOR SIMULTANEOUS 3D PRINTING OF A PLURALITY OF OBJECTS

(71) Applicant: NEOTECH AMT GMBH, Nuremberg (DE)

(72) Inventors: Martin Hedges, Nuremberg (DE); Mirko Süttenbach, Schwabach (DE)

(73) Assignee: NEOTECH AMT GMBH, Nuremberg (DE)

( * ) Notice: Subject to any disclaimer, the term of this patent is extended or adjusted under 35 U.S.C. 154(b) by 266 days.

(21) Appl. No.: 17/290,786

(22) PCT Filed: Sep. 17, 2019

(86) PCT No.: PCT/EP2019/074912
§ 371 (c)(1),
(2) Date: May 3, 2021

(87) PCT Pub. No.: WO2020/088832
PCT Pub. Date: May 7, 2020

(65) Prior Publication Data
US 2021/0379826 A1 Dec. 9, 2021

(30) Foreign Application Priority Data
Nov. 2, 2018 (DE) .................... 10 2018 127 382.7

(51) Int. Cl.
*B29C 64/209* (2017.01)
*B29C 64/182* (2017.01)
(Continued)

(52) U.S. Cl.
CPC .......... *B29C 64/209* (2017.08); *B29C 64/171* (2017.08); *B29C 64/182* (2017.08);
(Continued)

(58) Field of Classification Search
CPC .. B41J 3/4073; B41J 3/40731; B41J 3/40733; B29C 64/171; B29C 64/176; B29C 64/182; B29C 64/209
See application file for complete search history.

(56) References Cited

U.S. PATENT DOCUMENTS

| 8,778,252 B2 * | 7/2014 | Mackie | B29C 64/188 |
| | | | 425/375 |
| 8,944,802 B2 * | 2/2015 | Patterson | B29C 64/118 |
| | | | 425/375 |

(Continued)

FOREIGN PATENT DOCUMENTS

| CN | 206106369 U | 4/2017 | |
| CN | 108327270 A * | 7/2018 | ........... B29C 64/209 |

(Continued)

OTHER PUBLICATIONS

3D Printing Dives into Mass Production, J. Kerns, Machine Design, Jan. 7, 2017 [https ://web.archive.org/web20170702153810/http://www.machinedesign.com:80/3d-printing/3d-printing-dives-mass-production], 3 pages.

(Continued)

*Primary Examiner* — Atul P. Khare
(74) *Attorney, Agent, or Firm* — LUCAS & MERCANTI, LLP; Klaus P. Stoffel (57) ABSTRACT

A device for simultaneous 3D printing of a plurality of objects, including a plurality of printing heads and a plurality of object holders each associated with one of the printing heads, wherein: the printing heads and the object holders can be moved relative to one another along three translation axes in three spatial dimensions by at least three translation actuators; the printing heads are arranged on exactly one carrier element and the object holders are arranged on one or more object holder carriers, or the printing heads are arranged on a plurality of carrier elements and the object (Continued)

holders are arranged on exactly one object holder carrier; the printing heads are arranged on the one carrier element or the plurality of carrier elements at an offset along at least two of the three translation axes.

19 Claims, 3 Drawing Sheets

(51) Int. Cl.
  *B33Y 30/00* (2015.01)
  *B29C 64/171* (2017.01)
  *B29C 64/232* (2017.01)
  *B29C 64/236* (2017.01)
  *B29C 64/241* (2017.01)
  *B29C 64/25* (2017.01)
  *B29C 64/20* (2017.01)
  *B29C 64/227* (2017.01)
  *B29C 64/30* (2017.01)
  *B29C 64/336* (2017.01)

(52) U.S. Cl.
  CPC ............ *B29C 64/20* (2017.08); *B29C 64/227* (2017.08); *B29C 64/232* (2017.08); *B29C 64/236* (2017.08); *B29C 64/241* (2017.08); *B29C 64/25* (2017.08); *B29C 64/30* (2017.08); *B29C 64/336* (2017.08); *B33Y 30/00* (2014.12)

(56) References Cited

U.S. PATENT DOCUMENTS

| | | | |
|---|---|---|---|
| 9,242,265 B2 * | 1/2016 | Hedges | ................. B41J 3/4073 |
| 11,207,829 B2 * | 12/2021 | Hakkaku | ................ B33Y 30/00 |
| 2005/0151785 A1 | 7/2005 | Greiser | |
| 2017/0217100 A1 | 8/2017 | Gardiner | |
| 2019/0344500 A1 * | 11/2019 | Côté | ..................... B29C 64/182 |

FOREIGN PATENT DOCUMENTS

| | | | | |
|---|---|---|---|---|
| CN | 108357102 A | | 8/2018 | |
| EP | 2730418 B1 | | 5/2014 | |
| KR | 101834663 B1 | * | 3/2018 | ............. B33Y 30/00 |
| KR | 20200023685 A | * | 3/2020 | ............. B33Y 50/02 |
| WO | 2018069749 A1 | | 4/2018 | |

OTHER PUBLICATIONS

International Preliminary Report on Patentability dated Apr. 27, 2021 and English translation equivalent thereof, 15 pages.

Chinese Patent Office issued an Office Action dated Nov. 10, 2022 regarding parallel Chinese Patent Application No. 201980072976.0, 4 pages.

* cited by examiner

DEVICE FOR SIMULTANEOUS 3D PRINTING OF A PLURALITY OF OBJECTS

CROSS-REFERENCE TO RELATED APPLICATIONS

The present application is a 371 of International application PCT/EP2019/074912, filed Sep. 17, 2019, which claims priority of DE 10 2018 127 382.7, filed Nov. 2, 2018, the priority of these applications is hereby claimed and these applications are incorporated herein by reference.

BACKGROUND OF THE INVENTION

The invention relates to a device for the simultaneous 3D printing of a plurality of objects, comprising a plurality of printing heads and a plurality of object holders which are in each case assigned to one of the printing heads, wherein the printing heads and the object holders by way of at least three translatory actuators are able to be moved relative to one another along three translation axes in three spatial dimensions, wherein the printing heads are disposed on exactly one carrier element, and the object holders are disposed on one or a plurality of object holder carriers, or wherein the printing heads are disposed on a plurality of carrier elements, and the object holders are disposed on exactly one object holder carrier.

Additive manufacturing methods which are also referred to as 3D printing methods are increasingly gaining importance in technical production processes. In addition to the use of these methods for manufacturing prototypes, there is also the ambition to use said methods for the manufacture of objects in comparatively small or large series. For construction-related reasons, only a single object can however be simultaneously produced by one printing head. In order for a plurality of objects of a series to be able to be simultaneously printed, either a plurality of devices have to be simultaneously operated, or devices which have more than one printing head and thus can simultaneously produce two or more objects have to be used. In particular the use of a plurality of simultaneously operated devices here however offers the disadvantage that the production costs, by virtue of the number of devices required to this end and by virtue of the relatively slow printing speeds, are very high already in the case of a small series of objects to be produced.

In order for the number of objects to be produced by means of one device to be increased, it is known for a plurality of printing heads to be disposed in one row on the device such that a plurality of identically embodied objects can be simultaneously printed. EP 2 730 418 B1 thus describes a 3D metering device which has at least two metering heads by means of which a metered media can be simultaneously applied in a 3D structure to at least two items. The metering heads which are disposed in one row here are able to be moved along three translation axes in relation to the holders for the items and along two rotation axes relative to one another.

SUMMARY OF THE INVENTION

The invention is based on the object of specifying a device for the simultaneous 3D printing of a plurality of objects, said device being improved in comparison to the above.

In order for this object to be achieved, it is provided according to the invention that the printing heads on the one carrier element or the plurality of carrier elements are disposed so as to be offset along at least two of the three translation axes.

The advantage of the solution according to the invention lies in that a compact construction of the device can be achieved by disposing the printing heads along at least two of the three translation axes. A compact construction here offers the advantage that the number of printing heads which can be moved by way of one, in particular exactly one, translatory actuator per translation axis can be increased, or that the size of the translatory actuators used can be kept small even in the case of a large number of printing heads. The complexity in the production of the device can be reduced in this way, which also has an advantageous effect on the costs of the series of objects to be produced by means of the device, as a result opening up 3D printing as a production method also to further applications.

The printing heads, in relation to the object holders which hold the object to be produced by the printing heads, are able to be moved relative to one another along three translation axes in three spatial directions. It is achieved as a result of this mobility that any arbitrary shape of object can be generated by the printing heads on the object holders. In principle, it is sufficient for the three translation axes to be mutually oriented in such a manner that any arbitrary position in space, or in the printing volume available for printing the object, respectively, can be approached by way of said translation axes. It is however preferable for each of the translation axes to be orthogonal to the two other translation axes such that the translatory movements can be based on a rectangular coordinate system. Since coordinate systems of this type are commonplace in technology, the production of the objects as well as the ease of operation of the device can be facilitated by using said coordinate systems. The object holders which are disposed on the one object holder carrier or the plurality of object holder carriers can be separate components which are fixedly or movably connected to the object holder carrier or the object holder carriers. It is also possible for all object holders, or part of the object holders, to be configured as a region of the object holder carrier, consequently configured so as to be integral to the object holder carrier, wherein the objects to be generated by the printing heads can in each case be produced on the region of the object holder carrier that is in each case assigned to one of the printing heads.

The relative movement is generated by at least three translatory actuators which are in each case assigned to the or an object holder carrier, or the or a carrier element, respectively. In order for the relative movement between the printing heads and the object holders to be generated, either the object holders, or the object holder carriers, respectively, on which the object holders are disposed, can be moved, and/or a movement of the carrier elements on which the printing heads are disposed can be performed. A translatory actuator which moves a carrier element or an object holder carrier here represents an actuator which initiates a translatory movement of the carrier element or of the object holder carrier, respectively, in relation to a stationary position. For example, an electric linear motor, or an electric rotary motor which is coupled to a movement mechanism that converts the rotating movement of the motor to a linear movement, can be used as a translatory actuator here. The use of hydraulic or pneumatic actuators as translatory actuators is likewise conceivable.

It can be provided according to the invention that the printing heads and the object holders by way of at least one rotary actuator are able to be moved relative to one another about at least one rotation axis. The possibility of moving the printing heads and the object holders relative to one another also about at least one rotation axis can facilitate the printing process, because it can be advantageous in many situations to be able to rotate an already printed portion of an object in relation to the printing head in order for the printing procedure to be continued. In principle, it is possible for the printing heads and the object holders to be able to be moved about three rotation axes which are in each case orthogonal to the other two rotation axes. It has however been demonstrated that a movement about two mutually orthogonal rotation axes is sufficient for efficient production processes. The provision of a relative rotating movement between the printing heads and the object holders about two rotation axes is easier to implement in technical terms than a relative rotating capability along three rotation axes. Each of the rotation axes preferably corresponds to one of the translation axes of the relative movement between the printing heads and the object holders, as this facilitates the ease of operation of the device.

In one preferred design embodiment of the invention it can be provided that the object holder carrier or carriers is/are in each case at least in portions able to be tilted by way of at least one rotary actuator, and/or that the at least one carrier element is at least in portions able to be tilted by way of at least one rotary actuator, and/or that the object holders comprise in each case one rotary actuator by way of which said object holders are able to be rotated about one of the at least one rotation axis.

By tilting an object holder carrier at least in portions, all object holders that are disposed on the object holder carrier can be tilted in relation to the printing heads. For example, at least one portion of an object holder carrier on which a plurality of object holders are disposed in one object holder row can be tilted by way of a rotation axis which runs in particular so as to be parallel to the object holder row such that all object holders of the object holder row are tilted in equal measure in relation to the respective printing heads. Of course, a plurality of tiltable portions having in each case one object holder row can also be provided. When the object holder carrier comprises only one object holder row, the entire object holder carrier may also be tilted. Relative tilting of this type is of course also possible when, additionally or alternatively to tilting an object holder carrier at least in portions, the carrier element on which the printing heads assigned to the object holders are disposed, is tilted at least in portions. For example, a portion of the carrier element on which a plurality of printing heads are disposed in one printing head row can be tilted by way of a rotation axis which runs in particular so as to be parallel to the printing head row, such that the printing heads of the printing head row are tilted in equal measure in relation to the respective object holders. Of course, a plurality of tiltable portions having in each case one printing head row can also be provided. When the carrier element comprises only a single printing head row, the entire carrier element may also be tilted.

Rotating the object holder in relation to the printing head assigned to the object holder can be achieved by way of object holders which comprise in each case one rotary actuator by way of which said object holders are able to be rotated about one of the at least one rotation axis. The tilting of the object holder carrier or carriers and/or the at least one carrier element at least in portions preferably takes place about a first rotation axis, and a rotation of the object holders preferably takes place about a second rotation axis, wherein the first rotation axis and the second rotation axis are mutually orthogonal. The relative mobility between the object holders and the printing heads along two rotation axes is preferably generated by a tilting capability of at least one portion of the object holder carrier as well as by a rotating capability of the individual object holders. This advantageously enables said object holders to dispense with tilting of the printing heads by way of tilting the carrier element such that the printing heads which are disposed on the carrier element can at all times be operated with a downward-pointing opening, for example.

An electric motor can be used as a rotary actuator, for example. It is also possible for the electric motor to be connected to a movement mechanism by way of which a plurality of object holder carriers, or a plurality of portions of an object holder carrier, are in each case able to be simultaneously tilted about a rotation axis, or a plurality of object holders are in each case able to be simultaneously rotated about a rotation axis, respectively, for example.

In one preferred design embodiment of the invention it can be provided that the object holder carrier or carriers by way of at least one translatory actuator is/are able to be moved along a first of the translation axes, wherein the carrier element or the carrier elements by way of at least two translatory actuators are able to be moved along a second and a third of the translation axes.

The relative movement, which between the object holders and the printing heads is provided along the three translation axes, is enabled by a mobility of the object holder carrier along a first of the translation axes as well as by a mobility of the carrier element along a second and a third of the translation axes. There is furthermore the advantage here that it can in this way be dispensed with rendering the at least one object holder carrier or the at least one carrier element so as to be movable about three translation axes. This simplifies the construction of the device in particular with a view to the disposal of the translatory actuators on the at least one object holder carrier, or on the at least one carrier element, respectively.

In one preferred design embodiment of the invention it can be provided that the first translation axis runs along a longitudinal direction of the device, the second translation axis runs along a transverse direction of the device, and the third translation axis runs along a vertical direction of the device, wherein the printing heads on the carrier element are disposed along two or more printing head rows which extend in the transverse direction, wherein each printing head row comprises at least three printing heads, wherein at least two of the printing head rows are mutually spaced apart along the vertical direction and/or along the longitudinal direction. The terms longitudinal direction and transverse direction here refer to two orthogonal directions which define a base area of the device. The assignation of the longitudinal direction, or of the transverse direction, respectively to one of the edges of the base area and thus to one of the edges of the device is fundamentally arbitrary and presently serves for being able to differentiate these different orthogonal directions. The vertical direction describes the direction orthogonal to the area defined by the longitudinal direction and the transverse direction, consequently the direction in which the height of the device disposed on the base area extends.

The printing head rows which in each case extend in the transverse direction can in each case comprise two or more printing heads. In the case of a printing head row which comprises three or more printing heads, it is provided that a spacing of the printing heads from neighboring printing heads in the transverse direction is in particular identical for the printing heads in all printing head rows. The device comprises at least two printing head rows, wherein the two printing head rows are mutually spaced apart along the vertical direction and/or along the longitudinal direction. Of course, it is possible for the device to comprise more than two printing head rows, wherein each of the printing head rows is in each case spaced apart to each of the other printing head rows in the vertical direction and/or in the longitudinal direction. It is enabled by this disposal of the printing head rows that the printing heads are placed in an order so as to be spaced apart along at least two of the three translation axes.

It can furthermore be provided according to the invention that the carrier element has at least one support portion having two sides which are spaced apart in the longitudinal direction, wherein at least one printing head row is disposed on the one side, and at least one translatory actuator is disposed on the other side, wherein the carrier element has two support portions which are spaced apart in the longitudinal direction and connected by way of at least one connecting portion of the carrier element, and/or wherein at least two printing head rows are disposed on top of one another on the one side of the at least one support portion. The support portion here can have a segment which extends substantially along the longitudinal direction and on which the printing head rows which extend in the transverse direction are disposed, for example in each case on a further segment of the support portion. Two printing head rows here can be disposed on top of one another on a side of the support portion which extends along the vertical direction and the transverse direction, as a result of which the printing heads are disposed so as to be offset along the transverse direction and along the vertical direction. At least one translatory actuator can be disposed on the side that lies opposite the printing head rows, the carrier element being able to be moved by way of said translatory actuator and the printing heads in turn being able to be moved by way of the carrier element. The support portion can be a frame, for example, which comprises two frame segments which extend in the vertical direction, cross braces which extend in the transverse direction being disposed between said frame segments, wherein the printing head row or the printing head rows is/are in each case disposed on a cross brace.

It is possible for the carrier element to comprise two support portions which are spaced apart in the longitudinal direction and which have, for example, in each case one segment extending in the vertical direction, and/or which are in each case embodied as a frame. The support portions here are spaced apart in the longitudinal direction and connected by way of at least one connecting portion of the carrier element which extends in the longitudinal direction. In this design embodiment, in each case at least one printing head row is in each case disposed on one side of a support portion. In this way, the printing heads are mutually spaced apart along the transverse direction as well as the longitudinal direction. Of course, it is possible for at least two printing head rows in each case to also be disposed on top of one another on the sides of the support portions that are spaced apart in the longitudinal direction such that all of the printing heads of the device are mutually spaced apart in the transverse direction, in the longitudinal direction and in the vertical direction. As a result, a particularly space-saving disposal of a plurality of printing heads, as well as a particularly space-saving construction of the device, can be achieved. Apart from saving space, a compact disposal of the plurality of printing heads, and thus also of the object holders, results in an improved mobility of the at least one carrier element, or of the at least one object holder carrier, respectively.

It can be provided according to the invention for the disposal of the at least one translatory actuator that the two support portions which are spaced apart in the longitudinal direction, and the at least one connecting portion, at least partially enclose, in particular in a U-shaped manner in which the legs are formed by the support portions and in which the base is formed by the at least one connecting portion, a receptacle space in which the at least one translatory actuator is disposed. The carrier element here can have a cross section which in the longitudinal direction and in the vertical direction is at least substantially U-shaped and which is laterally formed by in each case one of the support portions as well as by the connecting portion which extends in the longitudinal direction. A receptacle space in which the at least one translatory actuator for moving the carrier element is disposed remains between the support portions which form in each case one leg of the U-shape and the at least one connecting portion which forms the base of the U-shape. By virtue of the at least one translatory actuator being disposed in the receptacle space, the at least one printing head row on the support portions is preferably in each case disposed on that side of the support portion that faces away from the receptacle space such that the printing heads are in each case peripherally disposed on the carrier element and are directed outward. This can be interpreted as a "back-to-back" arrangement of the printing head rows because the printing head rows of one of the support portions turn their respective rear sides toward the printing head rows of the other support portion and are only mutually spaced apart by the support portions and the receptacle space. An embodiment of this type offers the advantage of a compact disposal of the printing heads about the carrier element and the at least one translatory actuator. An ideally compact disposal of the printing heads about the at least one translatory actuator advantageously reduces a moment of inertia of the carrier element and thus of the printer heads assembly when the latter are moved by way of the at least one translatory actuator. Actuating the at least one translatory actuator for moving the carrier element can be simplified in this way, and the quality of the object to be produced can be improved.

In one preferred design embodiment of the invention it can be provided that the support portions and the printing head rows are mirror-symmetrical to a symmetry plane which extends in the transverse direction and the vertical direction and runs between the support portions. Of course, it is also possible for the at least one connecting portion to be mirror-symmetrical to the symmetry plane. Additionally thereto, it can be provided that the support portions and/or the printing head rows are also mirror-symmetrical to a first further symmetry plane which extends in the longitudinal direction and the vertical direction, and/or a second further symmetry plane which extends in the longitudinal direction and the transverse direction. It can be achieved by generating a symmetry of the support portions and of the printing head rows in the longitudinal direction of the device, and optionally also by a symmetry of the support portions and/or of the printing head rows in the transverse direction of the device, that the carrier element to be moved has an ideally uniform distribution of weight in relation to the one or the plurality of symmetry planes. The at least one translatory actuator here can in particular be disposed in or close to a symmetry plane, or on an intersecting line or an intersection of two or three symmetry planes, respectively. This results in a disposal of the at least one translatory actuator close to a center of mass of the carrier element. This simplifies the actuation of the at least one translatory actuator which is provided for moving the carrier element, and simplifies the achievement of a positive quality as well as identical properties when printing the objects.

It can be provided according to the invention that the at least one support portion comprises a frame which for at least each printing head row disposed on the side of the support portion has one cross brace which extends in the transverse direction, wherein the printing heads of one printing head row are in each case fastened to the same cross brace, in particular by way of a spacer element. The frame can have, for example, two frame segments which extend in the longitudinal direction and in the vertical direction and which are mutually spaced apart along the transverse direction, the cross braces being in each case disposed between said frame segments. A stable and lightweight construction of the support portion is achieved in this way.

The printing heads of one printing head row here, by way of a spacer element, can be disposed on a cross brace which extends in the transverse direction. The spacer element here can be part of the support portion, or be a separate component which is fastened to the support portion and to the printing head or the printing heads. A spacing of the printing heads from the cross brace can in particular take place in the longitudinal direction by way of the spacer element such that the freedom of movement of the printing heads can advantageously be increased by virtue of the printing heads being spaced apart from the carrier element. It is in particular also possible for each of the printing heads to be spaced apart from the support portion by way of a separate spacer element.

For the at least one object holder carrier it can be provided according to the invention that said object holder carrier for movement is operatively coupled to at least one translatory actuator and is movable at least along the longitudinal direction, wherein a plurality of object holders on the at least one object holder carrier are disposed in at least two object holder rows which extend in the transverse direction, wherein the at least two object holder rows on the object holder carrier are disposed so as to be offset in the longitudinal direction and/or in the vertical direction in such a manner that the object holders of one object holder row are in each case disposed below the printing heads of one of the at least two printing head rows.

The at least one object holder carrier for movement is preferably operatively coupled to at least one translatory actuator and movable at least along the longitudinal direction. The relative mobility in the transverse direction and in the vertical direction between printing heads and object holders can in this case preferably take place by way of two translatory actuators on the one carrier element or on each of the carrier elements. The relative mobility along all three translation axes between the printing head and the object holders can be advantageously implemented by way of the mobility of the at least one object holder carrier in the longitudinal direction as well as by way of the mobility of the at least one carrier element in the transverse direction and the vertical direction.

In a manner analogous to the disposal of the printing heads in printing head rows which extend in the transverse direction, the object holders on the at least one object holder carrier are disposed in at least two object holder rows which extend in the transverse direction. The object holder rows on the at least one object holder carrier are disposed so as to be offset in the longitudinal direction and/or in the vertical direction. The disposal here takes place in such a manner that the object holders of one of the object holder rows are in each case disposed below one of the printing heads of one of the at least two printing head rows. Each printing head row is preferably assigned one object holder row, wherein each printing head is in particular assigned one object holder. Exactly one object holder is in particular present for each printing head, said object holder being disposed below the printing head. The object holder in the longitudinal direction and in the transverse direction here can have a size which corresponds at least to the extent of the printing volume in the longitudinal direction and in the transverse direction, such that an object to be printed can be completely disposed on the object holder during the printing process.

It can furthermore be provided according to the invention that the at least one object holder carrier has a frame having a plurality of cross braces which extend along the transverse direction, wherein the object holder rows are in each case disposed on, in particular on top of, a cross brace. The design embodiment of the object holder carrier as a frame, in a manner analogous to the design embodiment of the support portions of the carrier element, has the advantage that the overall weight of the at least one object holder carrier can advantageously be kept low, this enabling a simple mobility and precise positioning and thus printing results of a positive quality. The cross braces of the object holder carrier in the vertical direction are in particular mutually spaced apart so far that the free space above each of the object holders which are in particular disposed on the cross braces is sufficient for the printing heads of the printing head row assigned to the respective object holder row, wherein the printing heads of the upwardly following cross brace are at least spaced apart so far as the at least one carrier element is displaceable in the vertical direction for passing vertically through the printing volume, such that any collision between the printing heads on a cross brace disposed above the printing heads is avoided during printing.

In one preferred design embodiment of the invention it can be provided that the object holder rows, in each case by way of at least one rotary actuator, are able to be tilted about a rotation axis which runs in the transverse direction. The movement of a plurality of object holder rows here is advantageously coupled to a rotary actuator because collective tilting of the plurality, in particular all, of the object holders by way of only one rotary actuator is enabled in this way. A tiltable object holder row can be disposed, for example, on a rotatably mounted cross brace of an object holder carrier which is configured as a frame, such that the object holder row is able to be tilted by tilting the cross brace.

However, it is also possible for each object holder to be able to be tilted by way of a rotary actuator. In order to implement a potentially desired rotation of the object relative to the printing head, it can be provided that one or a plurality of object holders is/are in each case coupled to a further rotary actuator by way of which the object holders are in each case able to be rotated about a second rotation axis which runs in the vertical direction, for example. Each object holder row here is advantageously able to be tilted about a dedicated, first rotation axis, wherein the first rotation axes of the object holder rows extend in each case in the transverse direction and are mutually parallel. In the case of a rotating capability of the object holders, each individual object holder is able to be rotated about a second rotation axis which, in particular in a non-tilted state of the object holders, extends in the vertical direction, wherein the second rotation axes are in each case likewise mutually parallel. The further rotary actuators here can preferably be disposed on a tiltable cross brace such that the object holders can be tilted by tilting the cross brace, and rotated by way of the further rotary actuators about a likewise tilted second rotation axis.

It can be provided according to the invention for the printing heads that said printing heads are in each case configured for receiving material which is used for producing the objects and is in solid form, in particular filaments, pellets and/or powder, and/or for receiving material which is used for producing the objects and is in liquid form, in particular inks, pastes and/or resin, and/or that the printing heads are in each case configured for printing electronic components. The printing heads can thus be configured for printing by fused deposition modeling or fused filament fabrication, respectively, for example, and/or for manufacturing electronics, for example for printing objects by means of inkjet-based methods.

Further advantages and details of the invention are derived from the exemplary embodiments described hereunder as well as by means of the drawings in which:

DETAILED DESCRIPTION OF THE INVENTION

Figure 1:
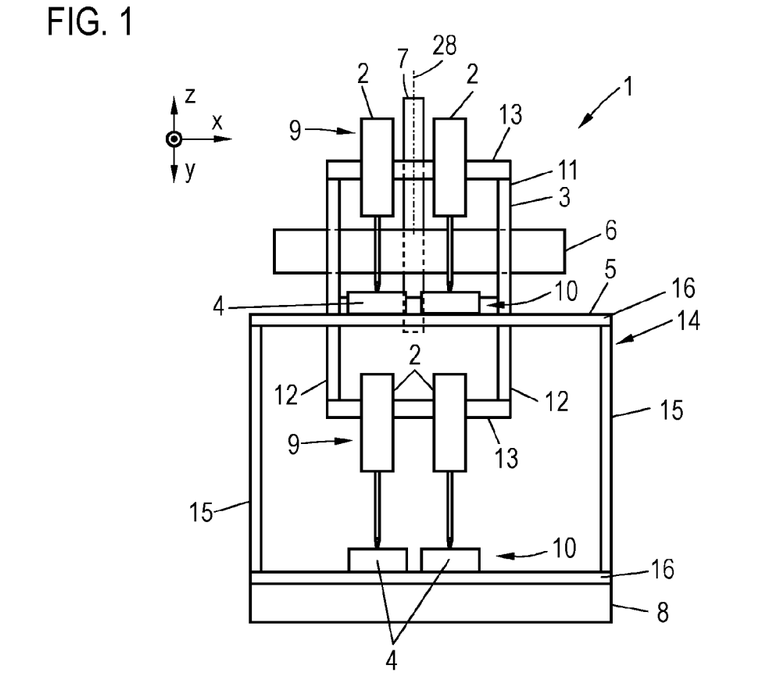
FIG. 1 shows a schematic front view of a first exemplary embodiment of a device according to the invention.

A front view of a first exemplary embodiment of a device 1 according to the invention is illustrated in FIG. 1. The device 1 comprises a plurality of printing heads 2 which are disposed on a carrier element 3 of the device 1. The device 1 furthermore comprises a plurality of object holders 4 which are disposed on an object holder carrier 5 of the device 1. The carrier element 3 by way of a first translatory actuator 6 is able to be moved along a transverse direction, here the X-direction, of the device 1. The carrier element 3 by way of a second translatory actuator 7 is able to be moved along a vertical direction of the device, here the Z-direction. Alternatively, it is possible for the carrier element 3 by way of the first translatory actuator 6 to be able to be moved along the vertical direction, and by way of the second translatory actuator 7 along the transverse direction. The object holder carrier 5 by way of a third translatory actuator 8 is able to be moved along a longitudinal direction, here the Y-direction, of the device 1.

A relative mobility along three translation axes between the printing heads 2 and the object holders 4 is provided by virtue of the mobility of the carrier element 3 along two translation axes which in this exemplary embodiment extend along the X-axis, or the transverse direction of the device 1, respectively, and the Z-axis, or the vertical direction of the device 1, respectively, as well as the mobility of the object holder carrier 5 in the Y-direction, or along the longitudinal direction of the device 1, respectively.

The object holders 4 are in each case disposed below one of the printing heads 2. It is enabled in this way during the operation of the device 1 that one object is in each case simultaneously printed by the printing heads 2 on the object holders 4. By virtue of the common relative mobility of the printing heads 2 in relation to the object holders 4, the simultaneously printed objects are of identical shape. Alternatively to the embodiment of the object holders 4 as separate components shown here, it is possible that all object holders 4, or part of the object holders 4, are configured as a region of the object holder carrier 5, consequently configured so as to be integral to the object holder carrier 5, wherein objects to be generated by the printing heads 2 can be produced on the region of the object holder carrier 5 that is in each case assigned to one of the printing heads 2.

The number of objects to be printed can be increased on account of the printing heads 2 being spaced apart in the transverse direction of the device 1 as well as in the vertical direction of the device 1, wherein a compact disposal of the printing heads 2 on the carrier element 3 is advantageously enabled such that a movement of all printing heads 2 of the device 1 can in each case be advantageously achieved by way of only a single translatory actuator per translation axis.

Two of the printing heads 2 illustrated are in each case disposed in one printing head row 9. Of course, it is possible for each printing head row 9 to comprise more than two printing heads 2 which are disposed so as to be offset in the transverse direction. In a manner corresponding to that of the printing heads 2, two of the object holders 4 are also in each case disposed in one respective object holder row 10. Each of the object holder rows 10 is assigned to one of the printing head rows 9, wherein one of the object holders 4 is in each case situated below one of the printing heads 2.

The carrier element 3 comprises a frame 11 which is composed of two frame segments 12 which extend along the vertical direction, as well as of two cross braces 13 which extend along the transverse direction. Each of the printing head rows 9 here is disposed on one of the cross braces 13 of the frame 11.

The object holder carrier 5 comprises a frame 14 which is formed by two frame segments 15 which extend in the vertical direction, as well as two cross braces 16 which extend in the transverse direction. Each of the object holder rows 10 is disposed on one of the cross braces 16 of the frame 14. The frame-type constructions of the carrier element 3 as well as of the object holder carrier 5 advantageously have a low overall weight such that the carrier element 3 can be moved in an ideally rapid and precise manner by way of the first translatory actuator 6 as well as the second translatory actuator 7, and the object holder carrier 5 can be moved in an ideally rapid and precise manner by way of the third translatory actuator 8.

The fastening of the carrier element 3 to the second translatory actuator 7 can take place, for example, by way of a rear-side plate of the carrier element, said plate not being shown in FIG. 1 and disposed on that side of the frame 11 that lies opposite the printing head rows 9. It is also possible for the second translatory actuator 7 to be fastened to one or a plurality of cross braces 13 and/or to one or a plurality of frame segments 12 which extend in the vertical direction.

Figure 2:
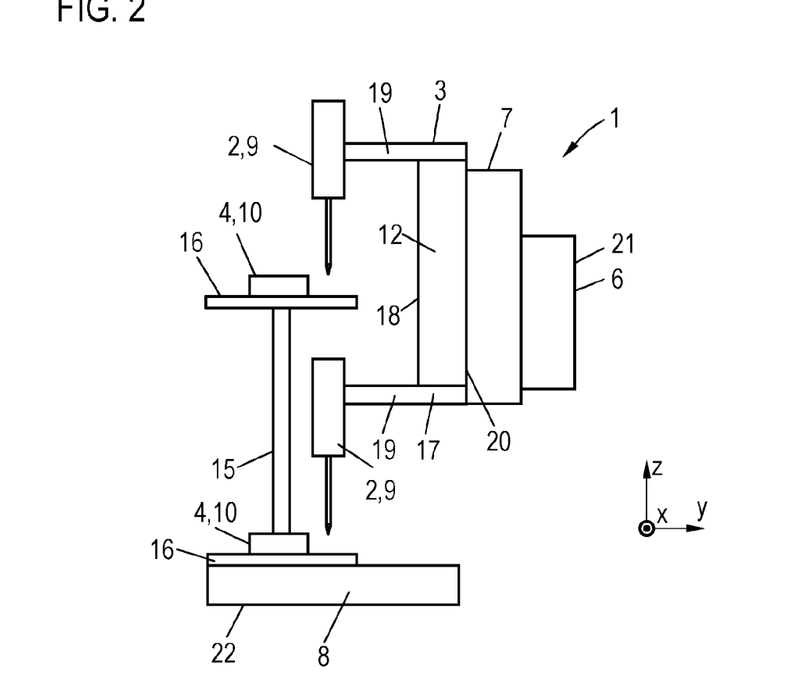
FIG. 2 shows a lateral view of the first exemplary embodiment of a device according to the invention.

A schematic lateral view of the first exemplary embodiment of the device 1 according to the invention is illustrated in FIG. 2. As can be seen, the carrier element 3 is fastened to the second translatory actuator 7 which in turn is fastened to the first translatory actuator 6. Of course, the first translatory actuator 6 is connected in a locationally fixed manner to a base plate of the device 1, for example, by way of a connection which is not illustrated here, such that the mechanical stability of the device 1 and the mobility of the carrier element 3 along the transverse direction and the vertical direction is provided. It is also possible for the carrier element 3 to be fastened to the first translatory actuator 6 which moves the carrier element 3 in the transverse direction, wherein the first translatory actuator 6 is fastened to the second translatory actuator 7 which is disposed in a locationally fixed manner. Accordingly, the third translatory actuator 8 which is fastened to the object holder carrier 5, is likewise fastened in a locationally fixed manner to the same base plate as the first translatory actuator 6, for example, such that the mobility of the object holder carrier 5 is also provided.

The carrier element 3 comprises a support portion 17 which in this exemplary embodiment is formed by the frame 11 and which along the longitudinal direction and the vertical direction has a rectangular cross section which is formed from one side of the frame segment 12 that extends in the vertical direction. The printing head rows 10, of which one printing head 2 can in each case be seen in FIG. 2, are disposed on one side 18 of the support portion 17. One spacer element 19, which in this exemplary embodiment is embodied as part of the carrier element 3, is in each case disposed here between the printing heads 2 and the support portion 17 such that the printing heads 2 in the longitudinal direction are spaced apart from the support portion 17. The relative mobility between the object holders 4 and the printing heads 2, or between the object holder carrier 5 and the support portion 17 of the carrier element 3, respectively, is enlarged by way of the printing heads 2 being spaced apart by the spacer elements 19. Alternatively, it is possible for all printing heads 2 of one printing head row 9, or all printing heads 2 which are disposed on the same side of the support portion 17, to be spaced apart from the support portion 17 by way of a common spacer element 19 of the carrier element 3.

The first translatory actuator 6 as well as the second translatory actuator 7 are disposed on the sides 20 of the support portion 17 that lie opposite the printing heads 2. As has been described above, the second translatory actuator 7 here is fastened to the carrier element 3, and the first translatory actuator 6 is fastened to the second translatory actuator 7. The translatory actuators 6, 7, 8 in this exemplary embodiment are embodied as electric linear motors, as a result of which, in a locationally fixed fastening of one side 21 of the first translatory actuator 6, a relative mobility of the carrier element 3 is possible along the transverse direction and the vertical direction as well as, in a locationally fixed disposal of one side 22 of the third translatory actuator 8, a relative mobility is possible along the longitudinal direction between printing heads 2 and the object holders 4.

Figure 3:
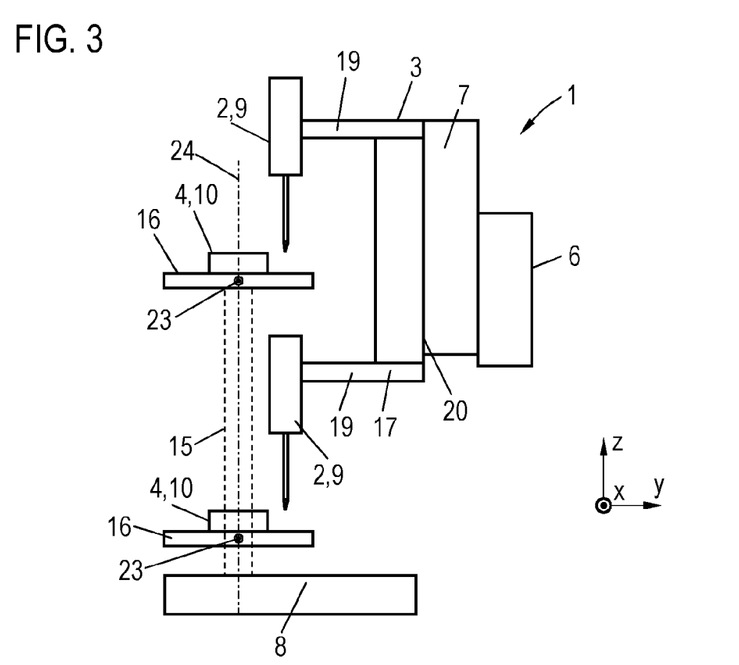
FIG. 3 shows a lateral view of a second exemplary embodiment of a device according to the invention.

FIG. 3 shows a schematic lateral view of a second exemplary embodiment of a device 1 according to the invention. As opposed to the previously described first exemplary embodiment, the device 1 according to the second exemplary embodiment additionally has the possibility of a relative movement between the object holders 4 and the printing heads 2 about two first rotation axes 23 as well as two second rotation axes 24. The first rotation axes 23 here run along the transverse direction and are offset along the vertical direction. The first rotation axes 23 here run in each case through one of the cross braces 16 of the object holder carrier 4. For reasons of clarity, the frame segment 15 which connects the two cross braces 16 is illustrated with dashed lines in FIG. 3.

Tilting of the object holder carrier 4 can take place by rotating the cross braces 16 about the first rotation axes 23, for example, by way of a first rotary actuator which is not illustrated in FIG. 3. To this end, the cross braces 16 can be rotatably mounted on the frame segments 15. The first rotary actuator can be, for example, a rotational electric motor which by way of a movement mechanism is coupled to the cross braces 16.

Furthermore, the object holders 4 are rotatable along two second rotation axes 24. The second rotation axes 24 in the case of non-tilted cross braces 16 likewise run in the vertical direction and are offset in the transverse direction in terms of the illustrated rotation axis 24. Each of the object holders 4 is coupled to a second rotary actuator by way of which a rotation of the object holders 4 about the second rotation axis 24 is enabled. The second rotary actuator can be, for example, a rotational electric motor by way of which the object holder 4 is able to be rotated. The second rotary actuator here can in particular be disposed on the same cross member 16 as the object holder 4 which is able to be rotated by said second rotary actuator. As a result, a tilting capability of the object holders 4 about the first rotation axes 23, as well as a rotating capability of the object holders 4 about the second rotation axes 24, which are likewise tilted when the cross member 16 is tilted, can be easier to implement. Additionally to the rotating movements, the object holders 4, by way of the third translatory actuator 8 which moves the object holder carrier 5, can be moved in the longitudinal direction, as has been described above.

Figure 4:
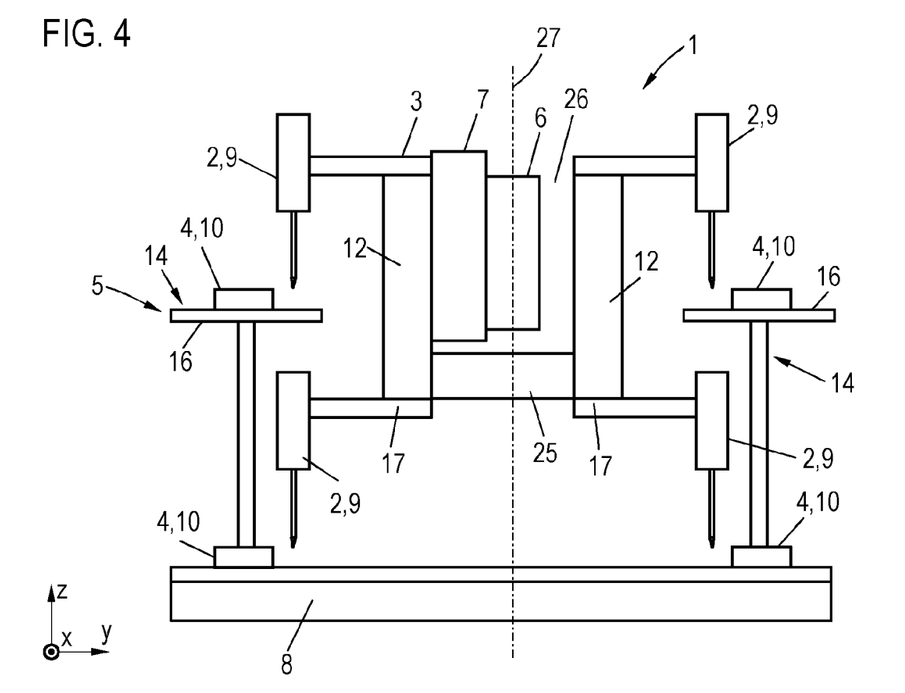
FIG. 4 shows a lateral view of a third exemplary embodiment of a device according to the invention.

A lateral view of a third exemplary embodiment of a device 1 according to the invention is illustrated in FIG. 4. The front view of the third exemplary embodiment corresponds to the illustration in FIG. 1, wherein it is of course also possible for the printing head rows 9, or the object holder rows 10, respectively, in the third exemplary embodiment to comprise in each case more than two printing heads 2 or object holders 4, respectively. The third exemplary embodiment differs in that the carrier element 3 comprises two support portions 17 which are connected by way of a connecting portion 25 of the carrier element 3. As has already been described in the context of FIGS. 1 and 2, the support portions 17 are in each case formed by a frame 11 which comprises frame segments 12 that extend in the vertical direction, as well as by cross braces 13 which are disposed between said frame segments 12 and on which one printing head row 9 is in each case disposed. In the view illustrated on the longitudinal direction and the vertical direction here, a U-shaped cross section of the carrier element 3 is created in which the legs of the U-shape are generated by the support portions 17, or the frame segments 12, respectively, and the base of the U-shape is generated by the connecting portion 25. A receptacle space 26 is at least partially delimited by the U-shape of the carrier element 3. The connecting portion 25 can be formed by at least one separate component which is fastened to the support portions 17, for example to the respective lower cross braces 16 of the frames 11. It is however also possible for the carrier element 3 to be integrally made, wherein the connecting portion 25 is adjacent to the support portions 17, in particular to the low cross braces 16 of support portions 17 which are formed by a frame 11.

The first translatory actuator 6 and the second translatory actuator 7 are received in the receptacle space 26. A particularly compact construction mode of the device 1 is achieved in this way. The disposal of the support portions 17, of the connecting portion 25 and of the printing heads 2 takes place in such a manner that said support portions 17, connecting portion 25 and printing heads 2 are disposed symmetrically about a symmetry plane 27 which extends in the transverse direction and the vertical direction. A symmetrical disposal of the carrier element 3 as well as of the printing heads 2 can additionally also be achieved in terms of a further symmetry plane 28 which extends along the longitudinal direction and the vertical direction, as is illustrated in FIG. 1. A uniform distribution of weight of the carrier element 3 and of the printing heads 2 is achieved by the symmetry of the carrier element 3 and of the printing heads 2 in the longitudinal direction as well as by the symmetry of the latter in the transverse direction.

A disposal of the translatory actuators 6, 7 in the proximity of the center of gravity of the carrier element 3 and of the printing heads 2 is furthermore achieved by the disposal of the first translatory actuator 6 and the second translatory actuator 7 in the receptacle space 26. This has an advantageous effect on the mobility of the carrier element 3 by way of the first translatory actuator 6 and the second translatory actuator 7, because each of the printing heads 2 can be ideally moved in the same manner relative to the respectively assigned object holder 4 such that the objects printed by the printing heads 2 are ideally also of identical shape. The printing heads 2 here are in each case disposed on the sides 18 of the support portions 17 that lie opposite the receptacle space 26 such that said printing heads 2 each point outward and by way of the rear side thereof face the printing heads 2 at the respective other support portions 17. This disposal of the printing heads 2 can be interpreted as a "back-to-back" arrangement of the printing heads 2, which enables a particularly compact configuration of the device 1.

The second translatory actuator 7 can be fastened to one of the support portions 17 as well as to the first translatory actuator 6 which is disposed in a locationally fixed manner, as has already been described in the context of FIG. 1. Alternatively to being fastened to one of the support portions 17, the second translatory actuator 7 can also be fastened to the connecting portion 25. It is of course also possible for the first translatory actuator 6 to be fastened to a support portion 17 or to the connecting portion 25 of the carrier element 3 and to a second translatory actuator 7 which is disposed in a locationally fixed manner.

The object holder carrier 5 in the third exemplary embodiment comprises two frames 14, the object holder rows 10 being disposed on the cross braces 16 of said frames 14, as has been illustrated above, such that one object holder 4 is disposed below each of the printing heads 2. In the third exemplary embodiment illustrated, a total of eight printing heads 2 can be moved relative to the respective object holders 4 assigned thereto in an identical manner by way of the first translatory actuator 6, the second translatory actuator 7 as well as the third translatory actuator 8, such that simultaneous 3D printing of a total of eight objects is possible. It is of course possible for more than two printing head rows 9 to be in each case disposed on top of one another on the support portions 17, and/or for the printing head rows 9 to comprise in each case more than two printing heads 2, such that printing of more than eight objects is also enabled. When there are more printing head rows 9 present than the printing head rows 9 illustrated, or when there are more printing heads 2 present per printing head row 9 than the printing heads 2 illustrated, respectively, there are of course also more object holder rows 10, or more object holders 4, respectively, provided such that one object holder 4 is provided for each printing head 2 present and in each case is disposed below one of the printing heads 2.

Alternatively to the one object holder carrier 5 illustrated, two separate object holder carriers 5 which have a plurality of object holder rows 10 offset in the vertical direction and which are in each case assigned to the printing head rows 9 that are disposed on one of the support portions 17 can also be provided. When a plurality of object holder carriers 5 are provided, the latter can be able to be moved by way of a common third translatory actuator 8, or a separate translatory actuator may be provided for each of the object holder carriers 5.

Figure 5:
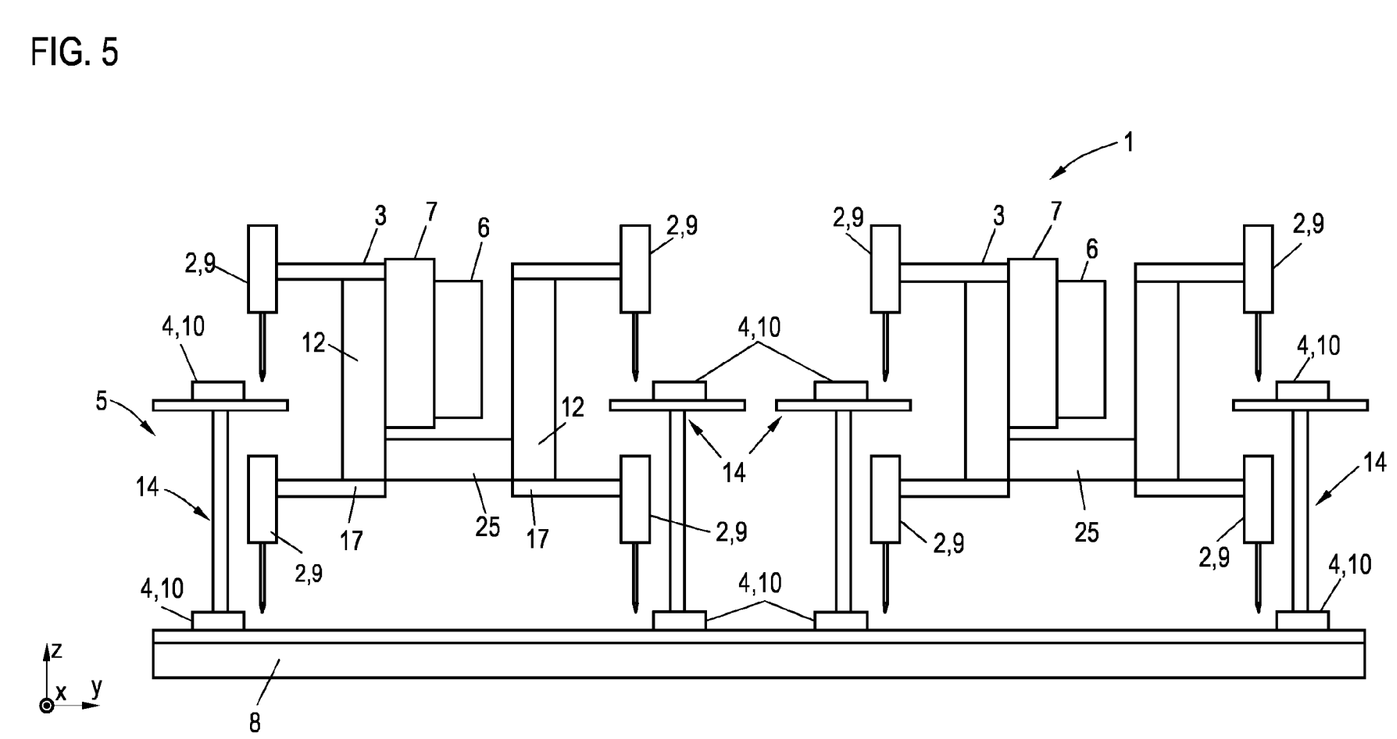
FIG. 5 shows a lateral view of a fourth exemplary embodiment of a device according to the invention.

A fourth exemplary embodiment of a device 1 according to the invention is illustrated in FIG. 5. The front view in this exemplary embodiment also corresponds to the illustration in FIG. 1, wherein it can be provided that more than more two printing heads 2 are provided per printing head row 9, and accordingly more than two object holders 4 are provided per object holder row 10. Provided in the fourth exemplary embodiment is an object holder carrier 5 which comprises four frames 14, two object holder rows 10 being in each case disposed on said four frames 14. The object holders 4 here are in each case assigned to one printing head 2, the latter being disposed in a total of eight printing head rows 9 on a total of two carrier elements 3. The embodiment of each of the carrier elements 3 here corresponds to the embodiment according to the third exemplary embodiment; the device 1 shown thus comprises two carrier elements 3 having in each case eight printing heads 2 in a "back-to-back" arrangement.

The carrier elements 3 are in each case able to be moved by way of a first translatory actuator 6 and a second translatory actuator 7 in the transverse direction or in the vertical direction, respectively. The object holder carrier 5 by way of a third translatory actuator 8 is able to be moved in the longitudinal direction. It is of course possible for more than two carrier elements 3 to be provided, wherein additional carrier elements 3 can be disposed in the longitudinal direction and/or in the transverse direction in relation to the carrier elements 3 illustrated. Should further carrier elements 3 be disposed in the transverse direction, the object holder rows 10 thus comprise such a number of object holders 4 that all printing heads 2 of the printing head rows 9 of the carrier elements 3 that are disposed in the transverse direction are in each case assigned one object holder 4. In the embodiment illustrated, a total of 16 objects can be simultaneously printed. By providing a single object holder carrier 5 which is assigned to a plurality of carrier elements 3, further third translatory actuators 8 can be dispensed with in comparison to the use of a plurality of individual devices, because all of the object holders 4 are able to be moved by way of one translatory actuator 8.

It is of course possible for a rotating movement about at least one rotation axis between the object holders 4 and the printing heads 2 to likewise be provided in the third exemplary embodiment shown in FIG. 4 as well as in the fourth exemplary embodiment shown in FIG. 5. In the case of the third and the fourth exemplary embodiment, these rotating movements can also in each case be performed in a manner corresponding to the embodiments in the context of the second exemplary embodiment according to FIG. 3.

The printing heads 2 can be configured for receiving material which is used for producing the objects and is in the form of filaments, pellets or powder, for example. In this way, objects can be produced by means of layered melt, also referred to as fused deposition modeling (FDM) or fused filament fabrication (FFF). A configuration of the printing heads 2 for further printing methods for producing three-dimensional structures is also possible. It is in particular also possible for the printing heads 2 to be configured for printing electronic components from liquid materials such as inks, pastes and/or resin, for example by means of inkjet methods or similar.

The invention claimed is:

1. A device for the simultaneous 3D printing of a plurality of objects, the device comprising a plurality of printing heads and a plurality of object holders which are in each case assigned to one of the printing heads, wherein the printing heads and the object holders by way of at least three translatory actuators are able to be moved relative to one another along three translation axes in three spatial dimensions, wherein the printing heads are disposed on at least one carrier element, and the object holders are disposed on at least one object holder carrier, wherein the printing heads on the at least one carrier element are disposed so as to be offset from one another along at least two of the three translation axes, wherein the at least one object holder carrier by way of one of the translatory actuators is able to be moved along a first of the translation axes, wherein the at least one carrier element by way of two of the translatory actuators is able to be moved along a second and a third of the translation axes, and wherein the at least one carrier element has vertically spaced cross braces connected by a vertical frame segment, a respective one or more of the printing heads disposed on each of the cross braces.

2. The device according to claim 1, wherein the printing heads and the object holders by way of a rotary actuator are able to be moved relative to one another about at least one rotation axis.

3. The device according to claim 2, wherein the at least one object holder carrier has portions thereof able to be tilted by way of a rotary actuator, and/or the at least one carrier element has portions thereof able to be tilted by way of at least one rotary actuator, and/or the object holders comprise in each case one rotary actuator by way of which said object holders are able to be rotated about one of the at least one rotation axis.

4. The device according to claim 1, wherein the first translation axis runs along a longitudinal direction of the device, the second translation axis runs along a transverse direction of the device, and the third translation axis runs along a vertical direction of the device, wherein the printing heads on the at least one carrier element are disposed along two or more printing head rows which extend in the transverse direction, wherein each of the printing head rows comprises at least two of the printing heads, and wherein at least two of the printing head rows are mutually spaced apart along the vertical direction and/or along the longitudinal direction.

5. The device according to claim 4, wherein the at least one carrier element has a support portion having two sides which are spaced apart in the longitudinal direction, wherein at least one of the printing head rows is disposed on a first of the sides, and at least one of the translatory actuators is disposed on a second of the sides, and/or wherein at least two of the printing head rows are disposed on top of one another on the first side of the support portion.

6. The device according to claim 5, wherein the support portion is one of two support portions, wherein the two support portions which are spaced apart in the longitudinal direction, and at least one connecting portion, at least partially enclose a receptacle space in which the at least one translatory actuator is disposed.

7. The device according to claim 6, wherein the support portions and the printing head rows are mirror-symmetrical to a symmetry plane which extends in the transverse direction and the vertical direction and runs between the support portions.

8. The device according to claim 6, wherein the two support portions and the at least one connecting portion enclose the receptacle space in a U-shaped manner in which legs of the U are formed by the support portions and a base of the U is formed by the at least one connecting portion.

9. The device according to claim 5, wherein the support portion comprises a frame which, for each of the printing head rows disposed on the first side of the support portion, has the cross braces extending in the transverse direction.

10. The device according to claim 9, wherein the printing heads of one of the printing head rows are in each case fastened to a respective one of the cross braces by a spacer element.

11. The device according to claim 5, wherein the at least one carrier element has two support portions which are spaced apart in the transverse direction and connected by way of a connecting portion of the at least one carrier element.

12. The device according to claim 4, wherein the at least one object holder carrier is operatively coupled to at least one of the translatory actuators and is movable at least along the longitudinal direction, wherein a plurality of the object holders on the at least one object holder carrier are disposed in two object holder rows which extend in the transverse direction, and wherein the two object holder rows are disposed so as to be offset from one another in the longitudinal direction and/or in the vertical direction in such a manner that the object holders of one of the object holder rows are in each case disposed below the printing heads of one of the at least two printing head rows.

13. The device according to claim 12, wherein the at least one object holder carrier has a frame having a plurality of lower cross braces which extend along the transverse direction, and wherein the object holder rows are disposed on the cross braces.

14. The device according to claim 13, wherein the object holder rows are disposed on top of the lower cross braces.

15. The device according to claim 12, wherein the object holder rows, in each case by way of at least one rotary actuator, are able to be tilted about a rotation axis which runs in the transverse direction.

16. The device according to claim 1, wherein the printing heads are configured for receiving material which is used for producing the objects and is in solid form and/or for receiving material which is used for producing the objects and is in liquid form, and/or the printing heads are configured for printing electronic components.

17. The device according to claim 16, wherein the printing heads are configured for receiving filament, pellet and/or powder material.

18. The device according to claim 16, wherein the printing heads are configured for receiving ink, paste and/or resin material.

19. The device according to claim 1, wherein the at least one carrier element has a frame that comprises the cross braces and is C-shaped, the cross braces including an upper horizontal cross brace and a lower horizontal cross brace that are connected by vertical frame segments so that the frame has a C-shape when viewed along a horizontal of the translation axes.

* * * * *